UNITED STATES PATENT OFFICE.

THOMAS BROOKS, OF MINERVA, OHIO, ASSIGNOR, BY MESNE ASSIGNMENTS, TO HIMSELF, THOMAS JACKSON, FRANK A. FOSTER, AND CORNELIUS AULTMAN.

IMPROVEMENT IN THE MANUFACTURE OF STEEL FOR TOOLS, CUTLERY, &c.

Specification forming part of Letters Patent No. 118,100, dated August 15, 1871; reissue No. 4,692, dated January 2, 1872.

*To all whom it may concern:*

Be it known that I, THOMAS BROOKS, of Minerva, county of Stark, State of Ohio, did invent a new and useful Improvement in the Manufacture of Steel, of which the following is a full, clear, and exact description:

The first part of the invention relates to the production, as a new article of manufacture, of a new grade of steel, which I call a welding tool-steel—that is to say, a high steel—one which is adapted for use in cutlery and other edge-tools where clean sharp edges are required, together with toughness and malleability of metal, and which, at the same time, shall weld perfectly and solidly without the use of welding-fluxes or other chemical compositions. The invention further consists in the employment of certain new chemical compounds in the manufacture of steel, as will be hereinafter fully set forth and explained.

I take seventy-four pounds of bar-iron, fourteen ounces of tungsten, eight ounces of charcoal, three ounces of manganese, eight ounces of fluor-spar or chlorophane, and subject the same to the usual treatment employed in converting processes in a smelting-pot. To produce a finer quality of tool welding-steel I substitute two and a half ounces of calcium-tungstate for the tungsten, using the charcoal, manganese, and fluor-spar or chlorophane as above recited.

In the above-described processes I prefer to use Swedish roll-bar of the K. B. brand, as I find that to be very free from impurities and of very uniform quality, for which reason I can obtain satisfactory results with more certainty than I can by the employment of any other brand of iron with which I am acquainted. So, also, I prefer, when using this particular grade of iron, to use the ingredients in the proportions named; but I do not wish to be limited to these particular proportions, as they necessarily depend somewhat upon the kind of iron to be operated upon.

To produce a file-steel I take about seventy-four pounds of Bessemer scrap or rail-bar, one and a half pounds of cast-iron or two pounds of fluor-spar or chlorophane, one-half ounce of manganese, one and one-half ounce of charcoal, one ounce of bismuth, and treat in a smelting-furnace. The steel produced from these ingredients and by these processes will weld without the usual chemicals for that purpose; will make tools with clean sharp edges; and be perfectly malleable and tough.

I am aware that a low steel, usually called a homogeneous steel, will weld without the use of fluxes; but this is but one step removed from wrought-iron; has in fact the fibrous texture of wrought-iron, and is made of wrought-iron just as it is "coming to nature" by adding a very small proportion of carbon. It cannot be properly called a steel, and, although it may be profitably employed for tires, axles, and similar heavy work, will take neither an edge nor temper in such manner that it can be employed for tools or cutlery. Hence I do not claim a low homogeneous steely wrought-iron; but What I do claim as new is—

1. A high welding tool-steel which will weld without the use of chemicals, compounds, or fluxes.

2. The use of tungsten, charcoal, manganese, and fluor-spar or chlorophane in the manufacture of steel, substantially as set forth.

3. In the process of converting iron into steel, calcium-tungstate, in combination with the ingredients stated, substantially as set forth.

4. In the process of converting iron into steel, bismuth, in combination with the ingredients used to produce a fine quality of file-steel, as described.

5. In the process of converting iron into steel, fluor-spar or chlorophane, in combination with the ingredients used to produce file-steel, as described.

THOMAS BROOKS.

Witnesses:
S. L. MCDEVANT,
GEO. W. RAFF.